United States Patent Office 3,351,611
Patented Nov. 7, 1967

3,351,611
LINEAR AROMATIC POLYESTERS
André Jan Conix, Antwerp, Belgium, assignor to Gevaert Photo-Producten N.V., Mortsel, Belgium, a Belgian company
No Drawing. Filed Nov. 8, 1965, Ser. No. 506,854
Claims priority, application Belgium, Dec. 13, 1957, 37,742, Patent 563,173
The portion of the term of the patent subsequent to Nov. 9, 1982, has been disclaimed
5 Claims. (Cl. 260—47)

This invention relates to the production of polymeric materials and particularly of linear aromatic polyesters and is a continuation-in-part of application Ser. No. 731,874, filed Apr. 30, 1958, now Patent No. 3,216,970.

In my copending application Ser. No. 725,498, now Patent No. 3,028,364, a process is described and claimed for preparing a highly polymeric linear polyester which comprises condensing a di-acid halide of an aromatic dicarboxylic acid, dissolved in an organic liquid which is a solvent for the polyester to be formed, with a metal phenolate of a bis-phenol dissolved in a liquid which is immiscible with the solvent for the di-acid halide, the aromatic dicarboxylic acid having the general formula $$HOOC-\langle\rangle-R'-\langle\rangle-COOH$$

and the bis-phenol having the general formula $$HO-\langle\rangle-R-\langle\rangle-OH$$

in which formulae the hydroxyl group and the carboxyl group may be in the para or meta position, and each of the R and R' represents an alkyl-, aryl-, cycloalkyl-, alkyl- and aryl-, or halogen-substituted methylene group or a carbon atom which forms part of the cycloaliphatic ring, or one represents such group or atom and the other represents a chemical bond, an oxygen atom, a carbonyl group, a sulphonyl group or a saturated hydrocarbon radical.

According to said copending application, especially high-molecular weights are obtained if the reaction is carried out in the presence of a catalyst, preferably a quaternary ammonium compound.

It is an important advantage of the process according to said copending application that it provides for a method for producing highly polymeric linear polyester according to which the condensation reaction may be carried out at room temperature and at atmospheric pressure, and whereby the polyester formed is kept in dissolution in the solvent for the acid halide.

It has now been found that the condensation method according to said copending application also can be applied for producing polyesters of high molecular weight, starting from other dicarboxylic acid halides as those disclosed in said copending application.

It is therefore an object of the present invention to provide new linear aromatic polyesters which dissolve quite well in low-boiling solvents and show high softening temperature. A further object of the present invention is to provide a suitable method for the production of such linear aromatic polyesters. Still further objects of the present invention will appear from the following description and claims.

According to the present invention, highly polymeric linear polyesters are prepared by condensing a di-acid halide of a di-carboxylic acid, dissolved in an organic liquid which is a solvent for the polyester to be formed, with a metal phenolate of a bisphenol, dissolved in a liquid which is immiscible with the solvent for the di-acid halide, the dicarboxylic acid being selected from the group consisting of isophthalic acid, terephthalic acid and fumaric acid, and the bis-phenol having the general formula $$HO-\langle\rangle-R-\langle\rangle-OH$$

wherein the hydroxyl groups are in the para or meta position, and R represents an alkyl-, aryl-, cycloalkyl-, alkyl- and aryl- or halogen substituted methylene group, or a carbon atom which forms part of a cycloaliphatic ring.

In this way, polyesters are obtained containing the recurring structural units according to the general formula $$\left[-O-\langle\rangle-\overset{R}{\underset{}{|}}-\langle\rangle-O-CO-A-CO-\right]$$

wherein R has the meaning given above and A represents a member selected from the group of the following bivalent radicals:

$$-\langle\rangle-,\quad -\langle\rangle-\quad \text{and}\quad -CH \atop \| \atop CH-$$

In the above formula, the radical R may represent e.g. one of the following bivalent radicals:

$$-\underset{CH_3}{\overset{|}{C}H}-,\ -\underset{CHCl_2}{\overset{|}{C}H}-,\ -\underset{CCl_3}{\overset{|}{C}H}-,\ -\underset{C_6H_5}{\overset{|}{C}H}-,\ -\underset{H_3C\ CH_3}{\overset{|}{C}H}-,\ \underset{H_2C\diagdown CH_2}{\overset{-C-}{\diagup}}\underset{CH_2}{\overset{CH_2}{|}}$$

$$-\underset{CH_3}{\overset{CH_3}{\underset{|}{C}}}-,\ -\underset{C_6H_5}{\overset{CH_3}{\underset{|}{C}}}-,\ -\underset{C_6H_5}{\overset{C_6N_5}{\underset{|}{C}}}-,\ -CH-\ \text{and}\ -\underset{CH_3}{\overset{CH_3}{\underset{|}{\overset{|}{C}}}}\underset{CH_3}{\overset{(CH_2)_n}{\underset{|}{C}}}$$

wherein $n$ and $n'$ each represents a positive integer from 1 to 7.

The following are bis-phenols, the metal phenolates of which can be used for preparing the polyesters according to the present invention:

1,1-(4,4'-dihydroxy-diphenyl)-cyclohexane,
1-phenyl-1,1-(4,4'-dihydroxy-diphenyl)methane,
1-phenyl-1,1-(4,4'-dihydroxy-diphenyl)ethane,
4,4'-dihydroxy-diphenyl-sulphone,
2,2-(4,4'-dihydroxy-3,3'-dimethyl-diphenyl)propane,
1,1,1-trichloro-2,2-(4,4'-dihydroxy-diphenyl)ethane,
2,2-(4,4'-dihydroxy-diphenyl)propane,
2,2-(4,4'-dihydroxy-diphenyl)1,1-dimethylpropane,
3,3-(4,4'-dihydroxy-diphenyl)heptane,
1,1-(4,4'-dihydroxy-diphenyl)propane,
1,1- or 2,2-(4,4'-dihydroxy-diphenyl)butane,
1,1-, 2,2- or 3,3-(4,4'-dihydroxy-diphenyl)pentane,
1,1-diphenyl-1,1-(4,4'-dihydroxy-diphenyl)methane,
2,2-(3,3'-dihydroxy-diphenyl)propane,
2,2-(3,3'-dihydroxy-diphenyl)1,1-dimethylpropane.

The invention includes polyesters obtained by reacting a mixture of two or more of the specified diphenolates with one or more of the specified aromatic dicarboxylic acid halides or mixtures of two or more of these acid halides with one or more of the said diphenolates. Especially good results are obtained when using a mixture of iso- and terephthalic acid.

The invention further includes polyesters obtained by using a mixture of one or more of the above-mentioned bis-phenolates, with diphenolates such as e.g. those derived from hydroquinone, resorcine, di-p-hydroxy-diphenyl, di-p-hydroxy-diphenylsulphone, di-p-hydroxy-benzophenone et cetera, or by using a mixture of one or more of the above mentioned dicarboxylic acid halides with, in minor amounts, halides of other dicarboxylic acids, such as those used in the process according to our copending application already identified.

According to the process of the invention, especially high molecular weights are obtained if the reaction is carried out in the presence of a suitable catalyst such as a quaternary ammonium compound, more particularly a quaternary ammonium compound which is soluble both in water and in the organic solvent used for the dicarboxylic acid halide, such as e.g. trimethylbenzylammonium chloride, triethylbenzylammonium chloride, dimethylethylbenzylammonium hydroxide.

It is an important advantage of the present invention that the reaction may be carried out at room temperature and at atmospheric pressure. The non-miscible solvents separately keep in dissolution the metal diphenolate and the acid halide together with the polyester formed.

We prefer to use water as the solvent for the metal phenolate and a halogenated hydrocarbon such as e.g. methylene chloride, chloroform, 1,2-dichloro-ethane, 1,1,2-trichloroethane, sym.-tetrachloroethane, methylchloroform, etc., as common solvent for the acid halide and the polyester formed during the reaction. Other water immiscible organic solvents can be used in association with water, such as benzene, toluene, dioxane et cetera.

The diphenolates can be formed by dissolving the diphenols in water in the presence of equivalent quantities of alkali-metal hydroxides such as sodium- or potassium hydroxides. Preferably, the di-acid halide is a chloride. Such chlorides can be obtained, e.g. by reaction of the respective dicarboxylic acids with thionyl chloride.

It is a particular advantage of the present invention that it provides for a polycondensation process according to which aromatic polyesters can be produced which possess an exceptional high molecular weight as indicated by their intrinsic viscosities ranging from 0.5 to 2.5 determined in dichloroethane or tetrachloroethane solution.

In this respect the aromatic polyesters produced according to the process of the present invention possess outstanding properties over the formerly proposed polyesters derived from phthalic acids and bis-phenols, such as the film-forming polyesters obtained by reacting isophthaloyl chloride, dissolved in carbontetrachloride, with the sodium salt of 2,2'-(4,4'-dihydroxydiphenyl)-propane dissolved in water, the polymer being directly formed at the interface of the water-carbontetrachloride system in the form of a translucent film. It is to be noted that the polymer formed is insoluble in carbontetrachloride, so that in this case no solvent for the polymer is present in the system. The polyesters prepared according to this method have a low molecular weight, as indicated by their low intrinsic viscosity which for the cited polyester is 0.34. Whereas it can be verified that it is not possible to obtain strong and flexible films from polyesters derived from dicarboxylic acids and bis-phenols if the intrinsic viscosity measured in 1,2-dichloroethane or tetrachloroethane solution does not exceed 0.5, the value of the intrinsic viscosity of polymers which can be used for the production of fibres or films is of uppermost importance. Particularly valuable films are obtained when the intrinsic viscosities of the polyesters are within the range of 1 to 2.

In accordance with the above considerations, it has been noticed that the films produced from isophthaloyl chloride and bis-phenolates according to the abovementioned formerly proposed method show inferior mechanical properties such as e.g. low tensile strength and low elongation at break; these films, which are moreover very brittle, can therefore not be used for such applications where a film with outstanding mechanical qualities is required, e.g. for the application as photographic film-base or as wrapping foil in the packaging field. From the polyesters produced according to the process of the present invention, however, films can be obtained which advantageously can be used for special purposes e.g. as photographic film-base, the polymers showing an intrinsic viscosity greater than 0.5, and in many cases, greater than 1.

The polyesters of the present invention are elastic thermoplastic materials showing different softening points depending on the nature of the diphenol or the di-acid used, but being in any case higher than 120° C. and in most cases higher than 150° C. In this respect, they are superior to the polyesters obtained e.g. by reacting isophthaloyl chloride with aliphatic glycols, and which have not found technical application on account of their low softening points. In consequence of the high softening point of the polyesters of the invention, the shaped articles produced therefrom possess excellent thermal stability so that even after protracted storage of the articles at temperatures of 140° C., their good mechanical properties remain unaltered.

Due to the fact that the polyesters of the invention are thermoplastic, they can be worked up from the melt into useful shaped articles by applying fabrication techniques known in the art such as pressing, moulding or vacuum-forming.

It is a further advantage of the present invention that it provides for highly polymeric linear polyesters which are soluble in low boiling solvents. Depending upon the special chemical structure of each of the polyesters involved, they are soluble in at least one halogenated hydrocarbon such as methylene chloride, chloroform, 1,2-dichloroethane, sym.-tetrachloroethane, methylchloroform, 1,1,2-trichloroethane etc. Most of the polyesters according to the invention, however, are soluble in more than one of the above mentioned halogenated hydrocarbons, and are moreover soluble in other solvents such as benzene, toluene, dioxane etc. From these solutions films can be cast which are quite transparent, even when obtained after very slow evaporation of the solvent.

The films or fibres prepared from the polyesters according to the invention by casting them from a solution in low boiling solvents or by extruding them from the melt need not necessarily be stretched and heat set in order to give them useful properties since the unstretched films show good mechanical properties and are especially flexible. If desired, however, the strength of shaped articles such as films and fibres prepared from the polyesters of the invention can be increased by stretching the articles in one or more directions at room temperature or preferably at some higher temperature depending on the softening point of the particular polyester involved.

It is a particular advantage of our invention that it provides for polyesters from which films can be produced which possess a high dimensional stability when exposed to varying temperatures on relative humidities. These properties, which are to be ascribed to the high softening points and the low water-absorption of the polyesters make them particularly useful for the manufacture of dimensionally stable photographic film base. Dimensional stability is an important requirement for a film support on which light-sensitive emulsions i.a. for graphic art work are to be coated.

A further advantage of the present invention is that it provides for polyesters which can be transformed out of the melt or from solutions into fibres showing good textile properties.

It is a special aspect of the present invention that the polyesters obtained by condensing fumaroyl dichloride with a bis-phenolate as defined hereinbefore can be made insoluble in all solvents by heating at a temperature above 200° C. The polyesters of this class can also be rendered insoluble by effectuating the condensation in the presence of polymerizable monomers such as vinyl compounds, so that cross linking occurs.

Another special aspect of the present invention is that the polyesters obtained from a mixture of iso- and terephthaloyl dichloride may be prepared at relatively low price since this mixture is prepared from a mixture of iso- and terephthalic acid which is commercially available at markedly more advantageous conditions than the iso- or terephthalic acid separately and that these polyesters are moreover soluble in halogenated hydrocarbons with boiling point below 100° C. from which solution clear and transparent films easily can be casted.

The present application is directed to polymers within the scope of the aforegoing disclosure prepared from a diphenol as previously defined and a dicarboxylic acid consisting essentially of fumaric acid alone. Similar polymers prepared from such diphenols and a dicarboxylic acid composed of 75–100% isophthalic acid and 25–0% terephthalic acid are claimed in the earlier mentioned parent application Ser. No. 731,874, while similar polymers prepared from such diphenols and a dicarboxylic acid consisting essentially of terephthalic acid alone are claimed in a concurrently filed continuing application Ser. No. 506,835.

The following examples illustrate the present invention. The softening points are obtained on films prepared from the polyesters.

The elongation of strips of films subjected to a load of 0.17 kg./mm.$^2$ is measured in function of the temperature. The temperature where a large rise in elongation is observed is taken as the softening temperature. It is to be emphasized that these temperatures have only a comparative value and are not to be confused with melting temperatures. In fact, they correspond more or less with glass transition temperatures.

EXAMPLE 1

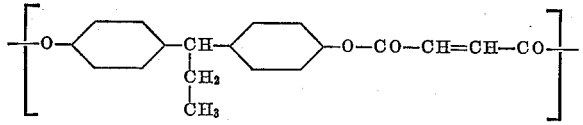

In a three-necked flask fitted with an agitator, thermometer and dropping funnel is brought a solution of 0.1 g. of triethylbenzylammonium chloride in 20 cm.$^3$ of methylene chloride and a solution of 4.6 g. of 1,1-(4,4'-dihydroxydiphenylene)propane and 1.6 g. of solid sodium hydroxide in 40 cm.$^3$ of water. While agitating the mixture vigorously, a solution of 3.1 g. of fumaroyl chloride in 20 cm.$^3$ of methylene chloride is dropwise added. The rate of addition of this solution is regulated in such a way that all the fumaroyl chloride is added within a period of 30 minutes. The temperature of the reaction mixture is preferably held at a temperature between 15 and 20° C. After addition of the fumaroyl chloride solution, the mixture is further agitated for 2 hours. After this time, the supernatant aqueous layer is decanted and the very viscous methylene chloride layer washed with water. Upon pouring the viscous methylene chloride layer washed with water. Upon pouring the viscous methylene chloride layer in a large excess of alcohol, a fibrous precipitate is formed which can be isolated by filtration. The intrinsic viscosity of the polymer thus obtained measured in dichlorethane solution is 0.7 (g./100 cm.$^3$). From low-boiling solvents such as methylene chloride and dichloroethane, clear films can be cast which are characterized by excellent mechanical properties, a low water-absorption and a high heat distortion temperature (175° C.). The films are especially useful as a film base for photographic emulsions.

EXAMPLE 2

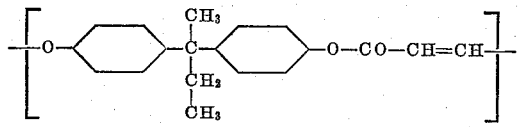

In a three-necked flask, fitted with stirrer, thermometer and dropping funnel, is placed 4.84 g. of 2,2-(4,4'-dihydroxy-diphenyl)butane, dissolved in 20.4 cm.$^3$ of sodium hydroxide 2.17 N in the presence of 100 mg. of triethylbenzylammonium chloride dissolved in 20 cm.$^3$ of methylenechloride. Under cooling the reaction mixture to 20° C. and stirring, there is added over a period of 30 minutes a solution of 3.21 g. of fumaroylchloride dissolved in 20 cm.$^3$ of methylenechloride. The mixture is stirred at room temperature for an additional 5 hours.

Subsequently, the stirring is stopped and the supernatant aqueous layer decanted. The organic layer is washed with distilled water and poured in an excess of ethanol. There is obtained 5.5 g. of a nearly white polymer which can be isolated by filtration. The softening point of the polymer is found to be about 130° C. The intrinsic viscosity, as determined in 1,2-dichloroethane solution, amounts of 0.6 dl./g.

EXAMPLE 3

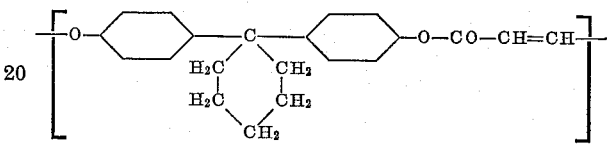

In a three-necked flask, fitted with stirred, dropping funnel and thermometer, is placed 5.36 g. of 1,1-(4,4'-dihydroxydiphenyl)cyclohexane together with 21 cm.$^3$ of sodium hydroxide 1.95 N and 100 mg. of triethylbenzylammoniumchloride dissolved in 20 cm.$^3$ of methylenechloride. Under cooling the reaction mixture to 17° C. and under stirring, there is added over a period of 20 minutes 3.06 g. of fumarolylchloride dissolved in 10 cm.$^3$ of methylenechloride. The mixture is stirred at room temperature for an additional 5 hours.

Subsequently, stirring is discontinued and the supernatant aqueous layer decanted. The organic layer is washed with water and poured into an excess of ethanol. The nearly white precipitate is filtered and dried. The softening point of films prepared of this material is found to be 180° C. The intrinsic viscosity of the polyester, as determined in 1,2-dichloroethane solution amounts to 0.83 dl./g.

I claim:
1. A high molecular weight linear polyester of polybasic acid and polyhydric alcohol, said polybasic acid consisting essentially of fumaric acid, said polyhydric alcohol comprising at least one compound of the formula:

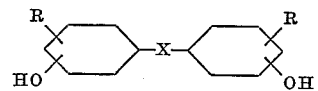

where each R is selected from the group consisting of hydrogen and lower alkyl and X is selected from the group consisting of:

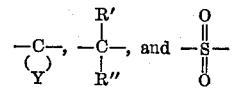

Y representing the atoms necessary to close a lower cycloaliphatic ring and R' and R'' each representing a member of the group consisting of hydrogen, an alkyl radical, a phenyl radical, a cycloalkyl radical, and a haloalkyl radical, alkyl in all instances being lower alkyl, said polymer having an intrinsic viscosity of at least about 0.5 dl./g. when measured in a solution of tetrachloroethane, and capable of forming a self-sustaining film.

2. A polyester as in claim 1 having an intrinsic viscosity of about 1–2 dl./g. when measured in a solution of tetrachloroethane.

3. A shaped article formed from a linear polyester according to claim 1.

4. A polyester as in claim 1 wherein said bis-phenolic compound is a bis-monohydroxyaryl-lower alkane.

5. A high molecular weight, linear polyester having an intrinsic viscosity of at least 0.5 when measured in a solution of tetrachloroethane and consisting essentially of recurring groups having the following general formula:

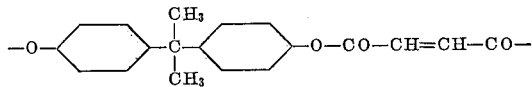

References Cited

UNITED STATES PATENTS

| | | | |
|---|---|---|---|
| 2,106,452 | 1/1938 | Bruson | 260—47 |
| 2,595,343 | 5/1952 | Drewitt | 260—47 |
| 2,708,617 | 5/1955 | Magat | 260—47 |
| 2,808,394 | 10/1957 | Speck | 260—79.3 |
| 2,839,508 | 6/1958 | Williams | 260—79.3 |
| 2,854,434 | 9/1958 | Beaman | 260—87.5 |
| 3,028,364 | 4/1962 | Conix | 260—49 |
| 3,216,970 | 11/1965 | Conix | 260—47 |

FOREIGN PATENTS 464,762  4/1937  Great Britain.

OTHER REFERENCES

Conix: I and E/C, pp. 147–150, vol. 51, No. 2, February 1959.

WILLIAM H. SHORT, *Primary Examiner.*

SAMUEL H. BLECH, *Examiner.*

J. C. MARTIN, L. P. QUAST, *Assistant Examiners.*